United States Patent [19]

Meyn

[11] Patent Number: 4,574,428
[45] Date of Patent: Mar. 11, 1986

[54] POULTRY TRANSFERRING DEVICE

[76] Inventor: Cornelius Meyn, c/o P.O. Box 16, Oostzaan, Netherlands

[21] Appl. No.: 570,907

[22] Filed: Jan. 16, 1984

[51] Int. Cl.$^4$ ............................................. A22C 21/00
[52] U.S. Cl. ........................................ 17/11; 17/44.1; 17/52; 198/480; 198/695
[58] Field of Search ................. 17/11, 11.1 A, 11.1 R, 17/24, 44.1, 45, 52; 198/477, 479, 480, 695

[56] References Cited

U.S. PATENT DOCUMENTS

| 1,622,686 | 3/1927 | Sutherland | 198/695 |
| 2,602,533 | 7/1952 | Bruce | 198/480 |
| 3,405,423 | 10/1968 | Vertegaal | 17/12 |
| 4,059,868 | 11/1977 | Meyn | 17/11.1 A |
| 4,071,924 | 2/1978 | Meyn | 17/44.1 |
| 4,178,659 | 12/1979 | Simonds | 17/44.1 |
| 4,283,813 | 8/1981 | House | 17/11.1 A |

FOREIGN PATENT DOCUMENTS 95809 12/1983 European Pat. Off. ................. 44.1/

Primary Examiner—W. D. Bray
Attorney, Agent, or Firm—Dority & Manning

[57] ABSTRACT

An apparatus for transferring fowl from shackles carried on a first conveyor line to shackles carried on another conveyor line. The apparatus includes a positioning means for positioning the fowl for transfer to a transfer wheel positioned between the first conveyor line and the second conveyor line. The transfer wheel 40 has a plurality of gripping devices 56 which grip the legs of the chicken as the chicken is rotated from adjacent the first conveyor line to the second conveyor line. When the transfer wheel is rotated so that the chicken is positioned adjacent the second conveyor line, a rotatable wheel 74 engages the ankles of the chicken forcing the chicken into a shackle 76 carried on the second conveyor line. The second conveyor line is equipped with a shackle positioning device 82 which hold the shackle during the transfer operation. After the chicken has been transferred to the second conveyor line, a slide block having a finger projecting outwardly therefrom engages the chicken between its spread legs wedging the ankles into the notches provided on the shackle.

14 Claims, 6 Drawing Figures

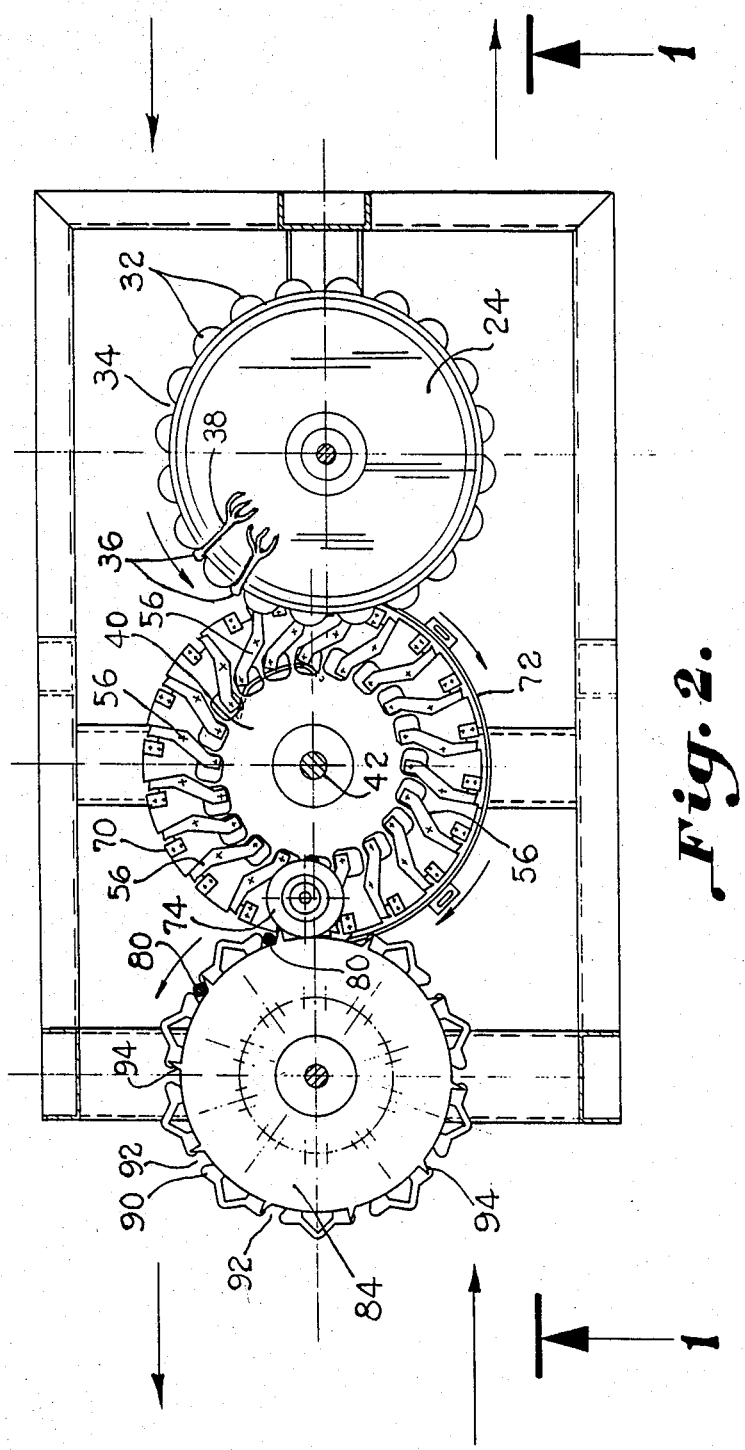

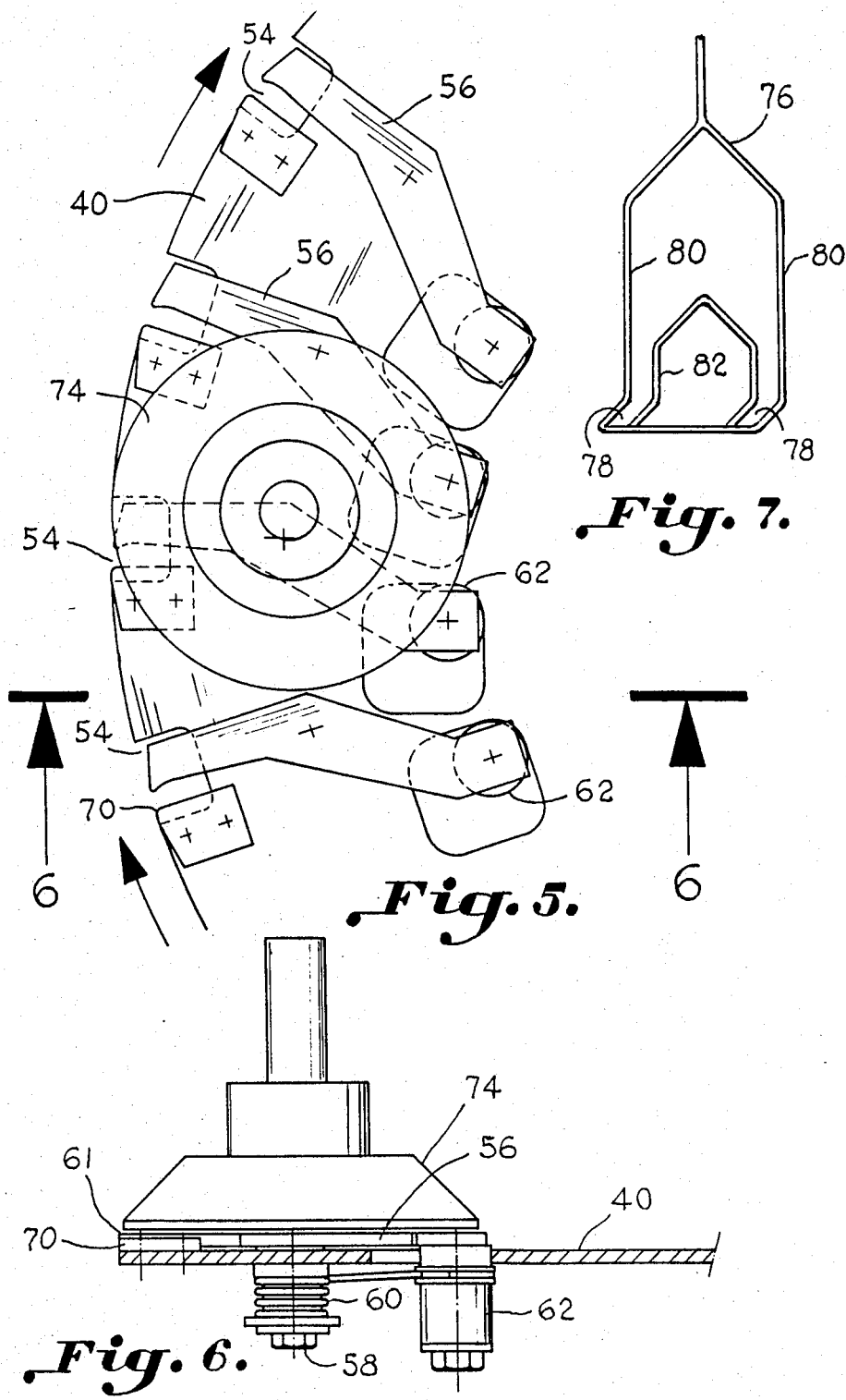

POULTRY TRANSFERRING DEVICE

BACKGROUND OF THE INVENTION

When processing poultry and other fowl such as chickens, first the chickens are hung by their hocks for moving through a feather plucking machine. After the plucking operation takes place, then they are normally transferred to another overhead conveyor for subsequent processing thereof. Before the transfer takes place, the hocks are cut off requiring the birds to be hung on another conveyor system that is used in the subsequent processing of the chicken. The removing and rehanging of the chickens is time-consuming and expensive as a result of the added labor costs involved in the total processing operation.

SUMMARY OF THE INVENTION

The structure constructed in accordance with the present invention provides an apparatus for transferring chickens and the like from shackles carried on a first conveyor to a receiver such as shackles carried on a second conveyor line spaced from the first conveyor line. The chickens are carried on conventional shackles carried on the conveyor line which includes notches for receiving the leg portions of the chicken so that the weight of the chicken holds the chicken within the shackle. The chicken can be readily released from the shackle by elevating it relative to the shackle to a height at which the notches are of sufficient width to permit passage of the leg portion therethrough. Of course it is to be understood that any suitable shackle can be used with the apparatus.

A positioning means is carried adjacent the end of the run of the first conveyor for engaging the leg portion of the chicken forcing the leg into a gripping means carried on a transfer wheel. The transfer wheel is positioned between the first and second conveyor. The transfer wheel is then rotated with the chicken secured therein by means of the gripping means to a position where it is adjacent a second conveyor line.

A guide rail extends around a portion of the transfer wheel for aiding in preventing the chicken from becoming disengaged from the gripping means as it is transferred from between the first conveyor line to the second conveyor line.

The second conveyor line has a shackle positioning means associated therewith. The shackle positioning means includes a pair of vertically spaced wheels that have circumferentially spaced projections provided thereon for engaging a pair of spaced vertically extending rodlike members forming part of the shackle. The positioning means rotates in synchronism with the transfer wheel so that the shackle is properly positioned for receiving the chicken from the transfer wheel. As the chicken approaches the transfer position, a rotatable wheel engages the ankle portion of the chicken extending above the transfer wheel and forces the ankles into notches provided on the shackle. As the ankles are being forced out of the slots provided on the transfer wheel, the gripping means, which includes resiliently biased arms, are pivoted against the force of a spring to allow the ankles to be transferred.

As the chicken is transferred to the receiving conveyor, a cam-operated member is inserted between the spread legs of the chicken and engages the chicken forcing it down pulling the ankles downwardly within the shackle to wedge the ankles in the shackle for positively holding the chicken in the shackle.

It is to be understood that the apparatus can be used in many different stages of the poultry processing procedure and, in one particular step, the hocks of the chicken are cut off prior to the chickens being transferred from the first conveyor line to the second conveyor line.

During this process, the chickens are supported by both ankles, however, it is to be understood that the same apparatus can be used for transferring a chicken that is hung by both legs from one conveyor to another conveyor where it is desired to hang the chicken only by one leg.

Any suitable drive mechanism can be used for synchronizing the rotation of the conveyor lines as well as the transfer wheels and the wheels used for positioning the chicken during the transfer operation.

The drive mechanism for the conveyor line is not illustrated since any suitable drive mechanism could be used. Typical examples of conveyor lines and shackles used in the poultry processing industry that could be suitably used in conjunction with the subject invention are disclosed in U.S. Pat. Nos. 4,071,924, 3,416,186, 4,322,872, and 4,339,848.

Accordingly, it is an important object of the present invention to provide an apparatus for automatically transferring fowl from one conveyor line to another without rehanging the fowl by hand.

Another important object of the present invention is to provide an apparatus wherein chickens being transported by a shackle system by means of their hocks are fed to an intermediate station where the hocks are cut off the bird and the bird is automatically rehung on a second shackle system by their ankles.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

BRIEF DESCRIPTION OF THE DRAWINGS

FIG. 2 is a plan view taken along line 2—2 of FIG. 1.

FIG. 5 is an enlarged plan view illustrating a portion of the transfer wheel and the mechanism for transferring the chicken from the transfer wheel to a receiving conveyor.

FIG. 6 is a sectional view taken along line 6—6 of FIG. 5.

FIG. 7 is perspective view of a typical shackle that can be utilized with the invention.

DESCRIPTION OF THE PREFERRED EMBODIMENT

Figure 1:
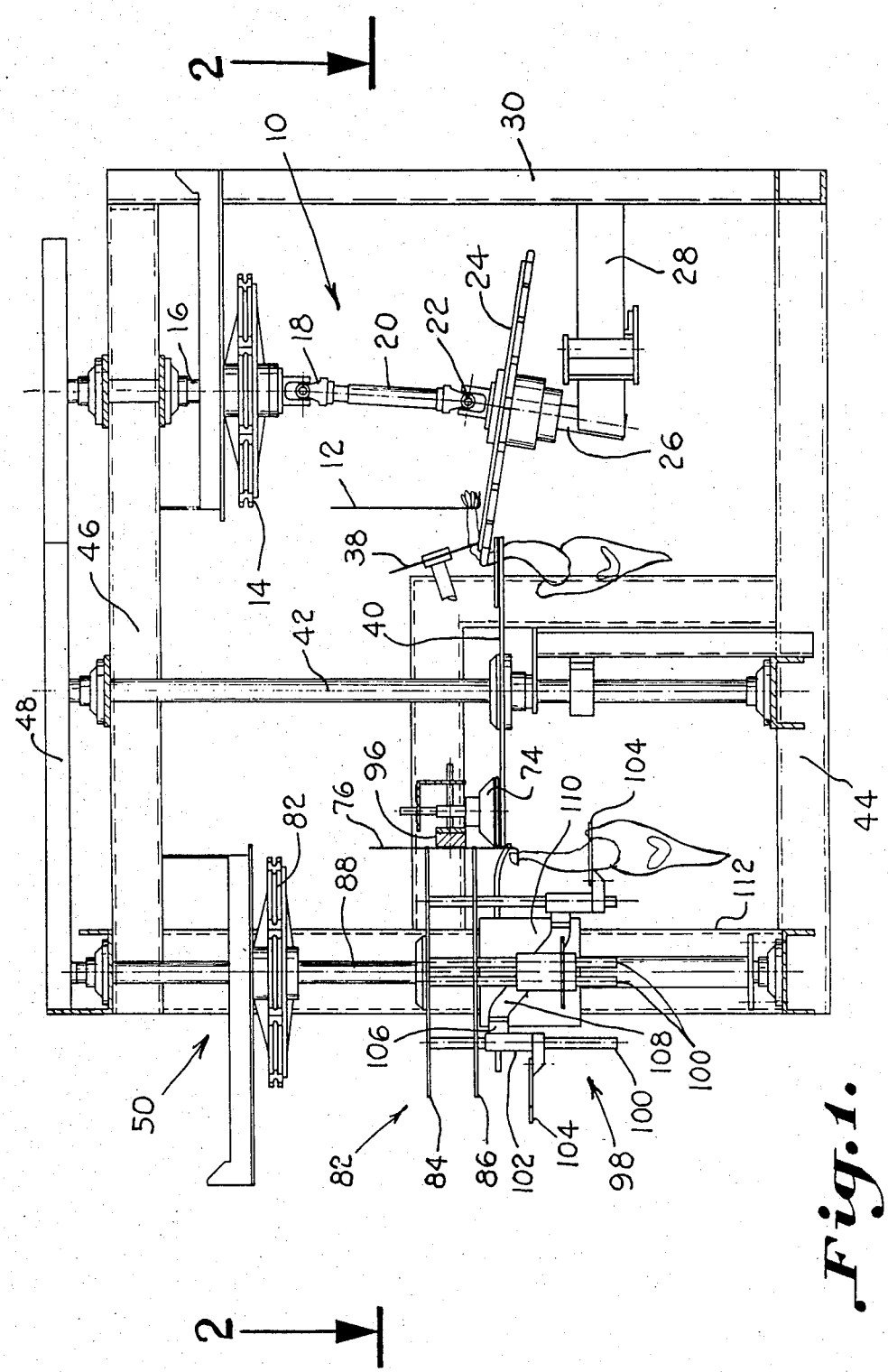
FIG. 1 is a sectional view, partially shown in schematic form, of an apparatus constructed in accordance with the present invention.
Figure 4:
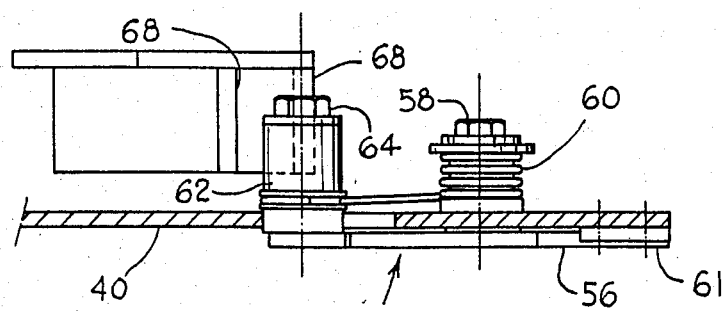
FIG. 4 is a sectional view taken along line 4—4 of FIG. 3.

Referring in more detail to FIG. 1 of the drawing, there is illustrated a first conveyor system generally designated by the reference character 10 showing a portion of a shackle 12 that is propelled along the conveyor line by a driving wheel 14. The driving wheel 14 is carried on a vertically extending shaft 16 which has a universal joint 18 connecting a lower end thereof to an intermediate linkage 20. The lower end of the linkage 20 is connected to another universal joint 22 which, in turn, couples the linkage 20 to a positioning wheel 24. The positioning wheel 24 is held at an angle by means of a shaft 26 connected to the lower end thereof that rides within a bearing member carried on the end of a horizontally extending support 28 that is, in turn, connected to the overall frame 30 of the machine. The positioning wheel 24 has scalloped projections 32 circumferentially spaced on the periphery thereof defining slots 34 therebetween into which the joint 36 between the ankles and the hocks 38 of the chicken is positioned.

While only a single chicken is being shown in FIG. 2 of the drawing, it is to be understood that the first conveyor line, which includes the shackles 12, are feeding the chickens in succession to the positioning wheel 24 and depending on the spacing of the shackles, they would fit between the successive scalloped projections on the positioning wheel 24.

The hocks are cut off of the chicken by means of a rotating blade 38 that extends directly over the positioning wheel 24. As can be seen as a result of the positioning wheel 24 projecting outwardly beyond the run of the shackles, the hocks are bent back to a position such as shown in FIG. 1 so that the cutting blade 38 can cut them off at the junction with the ankle of the chicken.

Positioned closely adjacent the positioning wheel 24 is a transfer wheel 40 that is rotated on a vertically extending shaft 42 that is supported on the base 44 of the frame and an upper support frame 46 of the frame. The shaft 42 is driven through any suitable mechanism carried within the housing 48 in synchronism with the shaft 16 which drives the first conveyor line 10 and the second conveyor line generally designated by the reference character 50. Additional support framing is provided for securely holding the shaft 42 and the transfer wheel 40 in position.

Figure 3:
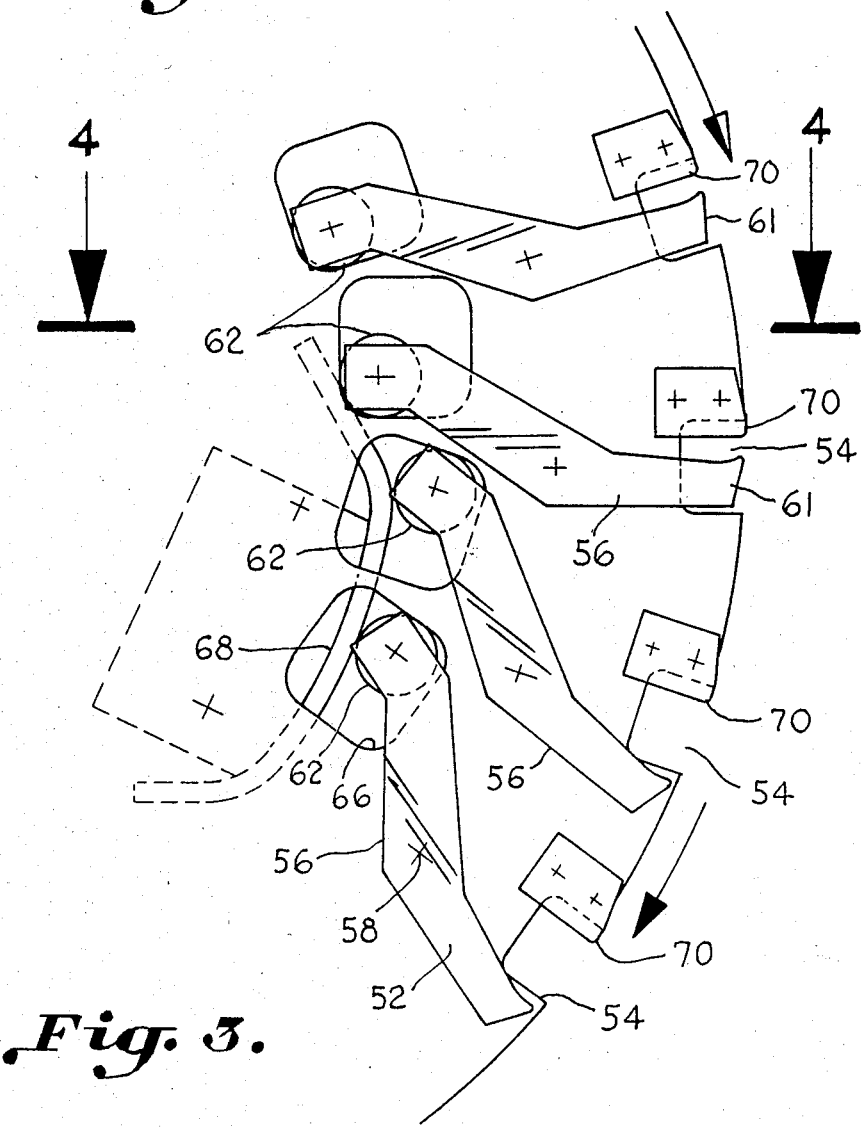
FIG. 3 is an enlarged plan view illustrating the gripping means forming part of the transfer wheel.

Referring now to FIGS. 2 and 3, a plurality of gripping means 52 are carried on the transfer wheel 40 for gripping the chicken by its ankles as it is transferred from the first conveyor line to the transfer wheel. The gripping means includes a plurality of circumferentially spaced slots 54 provided in the periphery of the transfer wheel. These slots are of sufficient width for receiving the leg of the chicken just below the ankle joint. When the chicken is transferred from the first conveyor line, the positioning wheel 24 forces the leg of the chicken into an open slot 54 of the transfer wheel. The slot 54 of the transfer wheel is open at the point of transfer as a result of pivotal arm 56 being pivoted about a shaft 58 to an open position as shown by the two lowermost pivotal arms in FIG. 3. The pivotal arms 56, as previously mentioned, are supported on a shaft 58 which has a torsion spring 60 provided thereon. The torsion spring 60 is connected so that the pivotal arm 56 is normally urged to in a closed position with an outer end 61 extending over the slot 54 as shown by the upper two pivotal arms 56 of FIG. 3. The inner end of the pivotal arms 56 have a roller 62 supported on a shaft of a bolt 64 extending downwardly through a square-shaped opening 66 provided in the transfer wheel. The roller 62 is provided for engaging a camming surface 68 which is secured underneath the transfer plate on any suitable framing, not shown. As a result of the camming surface 68 engaging the roller 62, the pivotal arm 56 is opened and closed at a predetermined position of the transfer wheel. When it is desired to transfer the legs of the chicken carried on the first conveyor line 10, the cam engages the roller 62 pivoting the pivot arms to the open position for receiving the legs of the chicken therein. After the transfer wheel 40 rotates beyond the transfer point, the roller 62 disengages from the cam surface 68 allowing the pivotal arms 56 to close on the legs of the chicken to grip the chicken between the outer end of the pivotal arm 61 and a block 70 extending into the slot 54. A guide plate 72 extends around a portion of the transfer wheel to provide a protective shield as well as for aiding in preventing the legs of the chicken from accidentally slipping out of the slot 54 on the transfer wheel.

In order to disconnect the chicken from the transfer wheel 40, a power-driven wheel 74 is positioned over the transfer wheel 40 at the point where it is desired to force the legs of the chicken out of the slots 54 on the transfer wheel. As the transfer wheel 40 is rotated in a clockwise direction, the portion of the legs which project up above the transfer wheel engages the rotating surface of the power-driven wheel 74. As it engages the surface of the power-driven wheel 74, the wheel forces the legs out of the slots 54 since the wheel projects out to the edge of the periphery of the transfer wheel. It is to be understood that the ankles of the chicken, which are projecting upwardly above the transfer plate, engage the power-driven wheel 74. The wheel 74 can be driven from any suitable source, not shown. When the legs are forced out of the slots 54 they are forced into shackles 76 carried on the receiving conveyor line 50. These shackles may be of any suitable construction and, in one particular embodiment, they include notches 78 into which the ankles of the chicken are forced into. The notches 78 are defined by outer bars 80 which are bent outwardly and a wedge-shaped bar 82 interposed therebetween. The shackles 76 are supported on the second conveyor line in any suitable conventional manner and are driven by means of the conventional driven mechanism of the conveyor and the rotating wheel 82. It is to be understood that other types of receivers could be used with the invention other than the shackles 76 carried on the second conveyor line.

In order to ensure proper transfer of the chickens from the transfer wheel 40 into the notches 78 of the shackles 76, a shackle positioning means generally designated by the reference character 82 is provided. The shackle positioning means includes a pair of vertically spaced positioning wheels 84 and 86. The positioning wheels 84 and 86 are fixed to a vertically extending driven shaft 88 upon which the driven wheel 82 is also carried. The wheel 86 has shackle-positioning members 90 circumferentially spaced on the periphery thereof with openings 92 provided therebetween for receiving the vertically extending rod-like portion 80 of the shackle. The wheel 84 is vertically spaced above the wheel 86 and also has projections 94 extending radially outwardly from the surface of the wheel. As a result of utilizing a pair of positioning wheels 84 and 86 which have projections thereon, the shackle is stabilized for the transfer operation. As can be seen in FIG. 1, there is also an arcuate guiding surface 96 extending over the transfer wheel 40 which cooperates with the two positioning wheels 84 and 86 to hold the shackle 76 in a definite position as it is being driven and positioned by the wheels 84 and 86 so that the ankles of the chicken can be inserted precisely into the notches 78 of the shackle during the transfer operation.

After the ankles have been inserted into the notches 78 of the shackle, means generally designated by the reference character 98 is provided for engaging the chicken at the junction of the two legs and the body and pulling the chicken downwardly for securely wedging the ankles of the chicken in the notches 78.

This means includes a plurality of members that are supported on vertical shafts 100 that have their upper ends fixed to the two plates 84 and 86 for rotating with the plates. Positioned on these shafts 100 is a slide block 102 which has an outwardly projecting finger 104 that is adapted to be inserted between the spread legs of the chicken. On the rear side of the slide block 102 is a cam follower 106 which rides within a track 108 carried on the outer surface of a drum 110 that is, in turn, fixed to a column 112 that extends around the driven shaft 88. Since the track 108 is fixed relative to the cam follower 106, as the slide blocks 102 are rotated with the two wheels 84 and 86, the slide block moves up and down from a lower position shown on the right in FIG. 1 to an upper position shown on the left as the discs rotate. This permits the outwardly projecting finger 104 to be inserted between the spread legs of the chicken at the transfer point of the chicken from the transfer wheel 40 to the shackle 76 causing the chicken to be forced down into the notches 78 of the shackles.

While it has been shown that the hocks of the chicken are being cut off using the positioning wheel 24 for positioning them relative to the cutting blade 38, it is to be understood it could be used for disengaging the chicken from the shackles of a conveyor line and forcing such into the gripping fingers of the transfer wheel 40. In most conventional systems for disengaging the ankles of the chicken from the shackles, a device is provided for lifting the chicken up slightly to release such from the notches 78 of the shackle. If it is desired to use such a mechanism, then positioning wheel 24 would be positioned in a horizontal position for ensuring a neat and effective transfer of the birds from a shackle to the transfer wheel.

The speed of rotation of the conveyor lines, as well as the transfer wheel, can be synchronized at any desired rate relative to each other if it is desired to vary the spacing between the chicken during the transfer operation.

It will be understood, of course, that while the form of the invention herein shown and described constitutes a preferred embodiment of the invention, it is not intended to illustrate all possible forms of the invention. It will also be understood that the words used are words of description rather than of limitation and that various changes may be made without departing from the spirit and scope of the invention herein disclosed.

I claim:

1. An apparatus for transferring fowl from one shackle carried on a first conveyor line to another shackle being carried on a second conveyor line, said fowl being carried on a conventional shackle with said legs of said fowl being carried in retaining members comprising:
    a positioning means positioning said fowl in a predetermined position as said fowl is moved by said first conveyor;
    a transfer wheel carried between said first conveyor line and said second conveyor line;
    gripping means carried adjacent the periphery of said transfer wheel engaging said legs of said fowl carried on said first conveyor line transferring said fowl by its legs from said shackle of said first conveyor line to said transfer wheel;
    means for rotating said transfer wheel moving said fowl from adjacent said first conveyor to adjacent said second conveyor line;
    a shackle positioning means carried adjacent said second conveyor line advancing forward said another shackle carried by said second conveyor line to a receiving position adjacent said transfer wheel, said shackle positioning means acting to position and stabilize said another shackle as said fowl is moved from said transfer wheel to said another shackle while said another shackle is in said receiving position; and
    means for disengaging said fowl from said gripping means carried on said transfer wheel and transferring said legs of said fowl into said another shackle carried on said second conveyor line.

2. The apparatus as set forth in claim 1 further comprising:
    said positioning means including,
       (i) a rotatable member engaging said fowl forcing said fowl into said gripping means carried on said transfer wheel.

3. The apparatus as set forth in claim 1 further comprising:
    circumferentially spaced slots provided in the periphery of said transfer wheel,
    said gripping means including,
       (i) a resiliently biased arm;
       (ii) means for selectively pivoting said resiliently biased arms over said slots in said transfer wheel for engaging said legs of said fowl inserted in said slot as said legs of said fowl are transferred from said shackle of said first conveyor means to said transfer wheel.

4. The apparatus as set forth in claim 3 further comprising:
    said means for selectively pivoting said resiliently biased arms including a cam carried adjacent said transfer wheel pivoting said arms to a first position for opening a respective slot when said respective slot is positioned adjacent said first conveyor for receiving said leg of said fowl in said slot and allowing said arm to pivot to a second position for holding said leg in said slot in said transfer wheel.

5. The apparatus as set forth in claim 1 further comprising:
    an arcuate guide having a curvature corresponding to the curvature of said transfer wheel extending closely adjacent a substantial portion of the circumference of said transfer wheel for aiding in holding said legs of said fowl in said gripping means as said transfer wheel is rotated.

6. The apparatus as set forth in claim 1 further comprising:
    said positioning means including,
       (i) a positioning wheel;
       (ii) leg positioning members circumferentially spaced on the periphery of said positioning wheel;
       (iii) means for rotating said positioning wheel in synchronism with said first conveyor and said transfer wheel for properly positioning said legs of said fowl for transfer from said shackle of said first conveyor to said transfer wheel.

7. The apparatus as set forth in claim 6 further comprising:
said leg positioning members including,
  (i) semicircular protrusions circumferentially spaced on the periphery of said positioning wheel defining gaps therebetween for receiving the legs of a fowl.

8. The apparatus as set forth in claim 1 further comprising:
said shackle positioning means including:
  (i) a shackle positioning wheel,
  (ii) shackle positioning member circumferentially spaced on the periphery of said shackle positioning wheel,
  (iii) means for rotating said shackle positioning wheel in synchronism with said transfer wheel for properly positioning said another shackle relative to said transfer wheel for receiving said legs of said fowl from said transfer wheel.

9. The apparatus as set forth in claim 8 further comprising:
said shackle positioning members including circumferentially spaced projections spaced sufficiently apart to define slots into which a portion of said another shackle extends for holding said another shackle during transfer of said fowl from said transfer wheel to said another shackle.

10. The apparatus as set forth in claim 8 further comprising:
said shackle positioning means including another shackle positioning wheel having circumferentially spaced projections vertically spaced from said shackle positioning wheel for aiding in positioning said another shackle for receiving said fowl from said transfer wheel.

11. The apparatus as set forth in claim 1 further comprising:
said means for disengaging said fowl from said gripping means carried on said transfer wheel and forcing said legs of said fowl into said another shackle carried on said second conveyor line including,
  (i) a power driven wheel extending over said transfer wheel adjacent said another shackle carried on said second conveyor line for engaging said legs of said fowl and forcing said legs from said transfer wheel into another shackle.

12. The apparatus as set forth in claim 1 further comprising:
means engaging said fowl for forcing said legs of said fowl down into said another shackle on said second conveyor line.

13. An apparatus for transferring a fowl from a shackle carried on a first conveyor line to a shackle carried on a second conveyor line comprising:
a transfer wheel having peripheral slots carried between said first conveyor line and said second conveyor line,
gripping means carried on said transfer wheel for holding fowl on said transfer wheel, said gripping means including selectively movable gripping members adjacent said peripheral slots in said transfer wheel, said gripping members selectively engaging said fowl as said fowl is transferred from said shackle of said first conveyor line to said transfer wheel,
means positioning said fowl carried on said first conveyor line into engagement with said gripping means carried on said transfer wheel for transferring said fowl from said first conveyor line to said transfer wheel;
means rotating said transfer wheel transporting said fowl from adjacent said first conveyor to adjacent said second conveyor line, and
means releasing said fowl from said gripping means of said transfer wheel and directing said fowl into said shackle carried on said second conveyor line.

14. An apparatus for transferring a fowl from a shackle carried on a conveyor line to a receiver, said fowl being carried on a conventional shackle with said legs of said fowl being carried in retaining members comprising:
a positioning means positioning said fowl in a predetermined position as said fowl is moved by said conveyor;
a transfer wheel having peripheral slots carried between said conveyor line and said receiver;
gripping means carried adjacent the periphery of said transfer wheel, said gripping means including selectively movable gripping members adjacent said peripheral slots in said transfer wheel, said gripping members selectively engaging said legs of said fowl carried on said conveyor line in transferring said fowl by its legs from said shackle of said conveyor line to said transfer wheel;
means for rotating said transfer wheel moving said fowl from adjacent said conveyor to adjacent said receiver;
means for disengaging said fowl from said gripping means carried on said transfer wheel and transferring said fowl to said receiver.

* * * * *